United States Patent [19]

Sata et al.

[11] Patent Number: 5,475,586
[45] Date of Patent: Dec. 12, 1995

[54] TRANSLATION APPARATUS WHICH USES IDIOMS WITH A FIXED AND VARIABLE PORTION WHERE A VARIABLE PORTION IS SYMBOLIC OF A GROUP OF WORDS

[75] Inventors: Ichiko Sata; Shuzo Kugimiya, both of Nara, Japan

[73] Assignee: Sharp Kabushiki Kaisha, Japan

[21] Appl. No.: 56,775

[22] Filed: May 4, 1993

[30] Foreign Application Priority Data

May 8, 1992 [JP] Japan .................................. 4-116418

[51] Int. Cl.⁶ ................................................. G06F 17/28
[52] U.S. Cl. ............................. 364/419.02; 364/419.04; 364/419.07; 364/419.11
[58] Field of Search ....................... 364/419.045, 419.07, 364/419.11, 419.02, 419.08; 395/700

[56] References Cited

U.S. PATENT DOCUMENTS

| | | | |
|---|---|---|---|
| 4,502,128 | 2/1985 | Okajima et al. | 364/419.08 |
| 4,641,264 | 2/1987 | Nitta et al. | 364/419.04 |
| 4,685,060 | 8/1987 | Yamano et al. | 364/419.04 |
| 4,980,829 | 12/1990 | Okajima et al. | 364/419.05 |
| 5,023,786 | 6/1991 | Kugimiya et al. | 364/419.04 |
| 5,151,857 | 9/1992 | Matsui | 364/419 |

FOREIGN PATENT DOCUMENTS

58-92063  6/1983  Japan .

*Primary Examiner*—Gail O. Hayes
*Assistant Examiner*—Joseph Thomas

[57] ABSTRACT

An electronic dictionary for storing a plurality of items such as idioms, where each item includes an entry string and information associated with the entry string. The entry string includes a first representative symbol representing a plurality of words having a prescribed common attribute. The information may include more than one representative symbol with each representing a separate group of words having a common attribute. An information retrieval apparatus identifies an input character string and an entry string by regarding the first representative symbol as being the same as any one of the words which the symbol represents, and outputs the information corresponding to the identified entry string. The dictionary enables information to be stored more efficiently and economically.

12 Claims, 11 Drawing Sheets

EXAMPLE ( This is a pen. )

- BUFFER A ...... ORIGINAL BUFFER

| t | h | i | s |   |   |   |   |
|---|---|---|---|---|---|---|---|
| i | s |   |   |   |   |   |   |
| a |   |   |   |   |   |   |   |
| p | e | n |   |   |   |   |   |
|   |   |   |   |   |   |   |   |

FIG. 6 PRIOR ART

- BUFFER B ...... PART OF BUFFER AS RESULT OF DICTIONARY LOOK UP

| | | | |
|---|---|---|---|
| this — — | PRONOUN | DEMONSTRATIVE ADJECTIVE | |
| is — — | VERB | | |
| a — — | ARTICLE | | |
| pen — — | NOUN | | |

PRIOR ART
FIG. 7

• BUFFER C .... BUFFER FOR RESULT OF SYNTAX ANALYSIS

PRIOR ART
FIG. 8

• BUFFER D .... BUFFER FOR RESULT OF TREE CONVERSION

FIG. 9

• BUFFER E .... OUTPUT BUFFER

| REPRESENTATIVE FORMS | DEFINITIONS |
|---|---|
| * | TRANSLATE NUMBER IN FORM OF NUMBER (ONE TWO, 3, 4) ETC |
| *1 | POSSESIVE PRONOUN NOT TRANSLATED IN REPRESENTATIVE FORM OF POSSESIVE PRONOUN (HIS, THEIR) ETC |
| *2 | TRANSLATE POSSESIVE PRONOUN IN REPRESENTATIVE FORM OF POSSESIVE PRONOUN (HIS, THEIR) |
| *3 | FLEXIVE PRONOUN NOT TRANSLATED IN FORM OF FLEXIVE PRONOUN (HIMSELF, THEMSELVES) ETC |

FIG. 12

| ENGLISH WORD | * years old |
| PART OF SPEECH | ADJECTIVE |
| TRANSLATION | *歳である |
| PART OF SPEECH | VERB |

FIG. 13

| ENGLISH WORD | make up *1 mind |
| PART OF SPEECH | VERB |
| TRANSLATION | 決心する |
| PART OF SPEECH | VERB |

FIG. 14

| ENGLISH WORD | in ＊2 behalf |
| --- | --- |
| PART OF SPEECH | ADVERB |
| TRANSLATION | ＊2のために |
| PART OF SPEECH | ADVERB |

FIG. 15

| ENGLISH WORD | by ＊3 |
| --- | --- |
| PART OF SPEECH | ADVERB |
| TRANSLATION | ひとりで |
| PART OF SPEECH | ADVERB |

FIG. 16

| 3 | NUMBER |
| --- | --- |
| year | NOUN |
| old | ADJECTIVE |

FIG. 17

| ＊ years old | ADJECTIVE (IDIOM) |
| --- | --- |
| 3 | NUMBER |
| year | NOUN |
| old | ADJECTIVE |

TRANSLATION APPARATUS WHICH USES IDIOMS WITH A FIXED AND VARIABLE PORTION WHERE A VARIABLE PORTION IS SYMBOLIC OF A GROUP OF WORDS

BACKGROUND OF THE INVENTION

1. Field of the Invention

The present invention relates to electronic dictionaries and information retrieval apparatuses including, but not limited to, translating machines equipped with such electronic dictionaries.

2. Description of the Related Art

Language processing apparatuses in practical use at present include word processors for aiding a person in making documents, translating machines for translating a document written in one language into another language and the like. These language processing apparatuses are provided with dictionaries for storing information depending upon their respective purposes. The term "dictionary" as used herein indicates a systematic arrangement in which a number of unit items each formed of an entry and various sets of information associated thereto are integrated so that a desired item can be easily retrieved utilizing its entry.

The dictionary is principally stored in a machine-readable non-volatile medium in a machine-readable manner. Such a dictionary stored in a machine-readable non-volatile medium in a machine-readable manner will be referred to as an electronic dictionary. When an electronic dictionary is used for machine translation, a word string (including a single word) in an original language (source language) is used as an entry. Various information associated with that word string includes the part-of-speech information of the word string, a translation of the word string in a corresponding language (target language), etc.

Consider a user that is going to process or produce a document utilizing such a language processor. If the document contains a word which is not included as an entry in the dictionary associated with the processor, work efficiency greatly decreases. Therefore, as many entries as possible are desirably prestored in the dictionary. Similarly, for machine translation, idioms in, the original language are paired with corresponding expressions in the target language, and are stored as entries. It is desirable to register as many pairs of idioms with their expression to improve Work efficiency.

When, for example, idioms are registered as entries in a dictionary, however, the following disadvantage is encountered. Idioms are likely to include a portion changing its form such as number and part of speech, i.e., possessive pronoun, flexive pronoun, in relation to the subject and other parts of the sentence or phrase. In order to improve translation efficiency, many idioms with their variable parts replaced with specific words must be registered in the dictionary. This imposes an increased work load on a person trying to register words in the dictionary. Further, the more entries registered in the dictionary, the capacity of the recording medium necessary to store the dictionary will correspondingly increase. Therefore such a method of registration is not desirable.

SUMMARY OF THE INVENTION

It is therefore one object of the invention to provide an electronic dictionary permitting retrieval of many entries including parts which can change (variable parts) such as number or part of speech (possessive pronoun, and flexive pronoun in English idioms), for reducing the storage capacity necessary to store the dictionary.

Another object of the invention is to provide an electronic dictionary permitting retrieval of many entries (including variable parts and appropriate information for the specific form of each variable part to be obtained), for reducing the storage capacity necessary to store the dictionary.

Yet another object of the invention is to provide a dictionary retrieval apparatus permitting retrieval of many entries including variable parts for reducing the storage capacity necessary to store the dictionary.

An additional object of the invention is to provide a dictionary retrieval apparatus permitting retrieval of many entries (including variable parts and appropriate information for the specific form of an input word string to be obtained), for reducing the storage capacity necessary to store the dictionary.

An electronic dictionary according to the invention includes a storage medium for storing a plurality of items. Each item includes an entry word string, and information selected to have a specific relation to the entry word string. Information in an item includes a first representative symbol representing a plurality of words having a prescribed attribute in common. Since a plurality of words are represented by one representative symbol, a plurality of entry strings can be registered as one entry string in an electronic dictionary, and the capacity of the dictionary necessary to store the information may be reduced.

The electronic dictionary according to one aspect of the invention includes an entry string with a first representative symbol and a second representative symbol representing a plurality of words with common attributes. Since a plurality of words having a prescribed attribute in common are represented by the first representative symbols as an entry string, a plurality of different entry strings can be registered as one entry string in the electronic dictionary. Information included in the item as the registered entry string including the first representative symbol can include a second representative symbol representing a distinct group of words. Accordingly, a plurality of entry strings can be stored as a single entry string, and information corresponding to the original plurality of entry strings can be separately obtained.

A dictionary retrieval apparatus according to another aspect of the invention utilizes an electronic dictionary according to yet another aspect of the invention which locates information corresponding to a given character string from the dictionary. The dictionary includes a storage medium for storing a plurality of items. Each item includes an entry string, and information selected to have a specific relation to the entry string. Information in an item includes a first representative symbol representing a plurality of words having a prescribed common attribute. The apparatus includes an identification system that recognizes the first representative symbol as indicative of the plurality of words represented by the symbol and identifying a given character string with one of a plurality of entry strings, and an output system for outputting information included in the same item as that of the entry string identified by the identification system. When identification of an input character string and an entry string is performed, the identification system regards the first representative symbol included in each entry string as being identical to any of the plurality of words represented by the symbol. Therefore, if the first representative symbol exists representing the plurality of words in an electronic dictionary, an agreement can be found between an entry string expressed in specific words and an entry string registered in the electronic dictionary by the first representative symbol. Then, the output system outputs the information included in the identified entry string such that information corresponding to the desired entry string can be presented to the user.

A dictionary retrieval apparatus according to yet another aspect of the invention uses an electronic dictionary in retrieving information corresponding to a given character string. The electronic dictionary includes a storage medium for storing a plurality of items. Each item includes an entry string, and information selected to have a specific relation to the entry string. Information in at least one item includes a first representative symbol representing a plurality of words having a prescribed common attribute. At least one piece of information included in an item which has an entry string including the first representative symbol includes a second representative symbol representing a plurality of words having a predetermined attribute in common. The apparatus includes an identification system for regarding the first representative symbol as being identical to any of the words represented by the symbol and identifying an input character string with an entry string, an extraction system for extracting information included in the same item as the entry string identified by the identification system, detection system for detecting whether or not the extracted information includes the second representative symbol replacement system for replacing the second representative symbol whose presence is detected by the detection system with one word selected from the words represented by the second representative symbol based on the words of the input character string, and output system for outputting the extracted information as if the second representative symbol is not included, and after the replacement by the replacement system as if the second representative symbol is included.

In the dictionary retrieval apparatus, when the identification system identifies an input character string and an entry string, the first representative symbol is regarded as being identical to any word represented by the symbol. When an entry expressed in specific words is registered utilizing the first representative symbol, whether or not an input character string coincides with an entry string can be determined, the extraction system extracts information included in the same item as the identified entry string. The detection system detects whether or not the information includes the second representative symbol. If the second representative symbol is included in the information, the replacement system replaces the representative symbol with a word or words represented by the second representative symbol based on the words regarded as identical to the first representative symbol by the identification system. Thus, the output system outputs information having the second representative symbol replaced, and therefore information appropriately corresponding to the original specific entry string can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of a dictionary retrieval apparatus according to the invention will be described as used in a translating machine. The invention is however not limited to translating machines, and can also be used in word processors, information retrieval apparatuses or the like.

Figure 1:
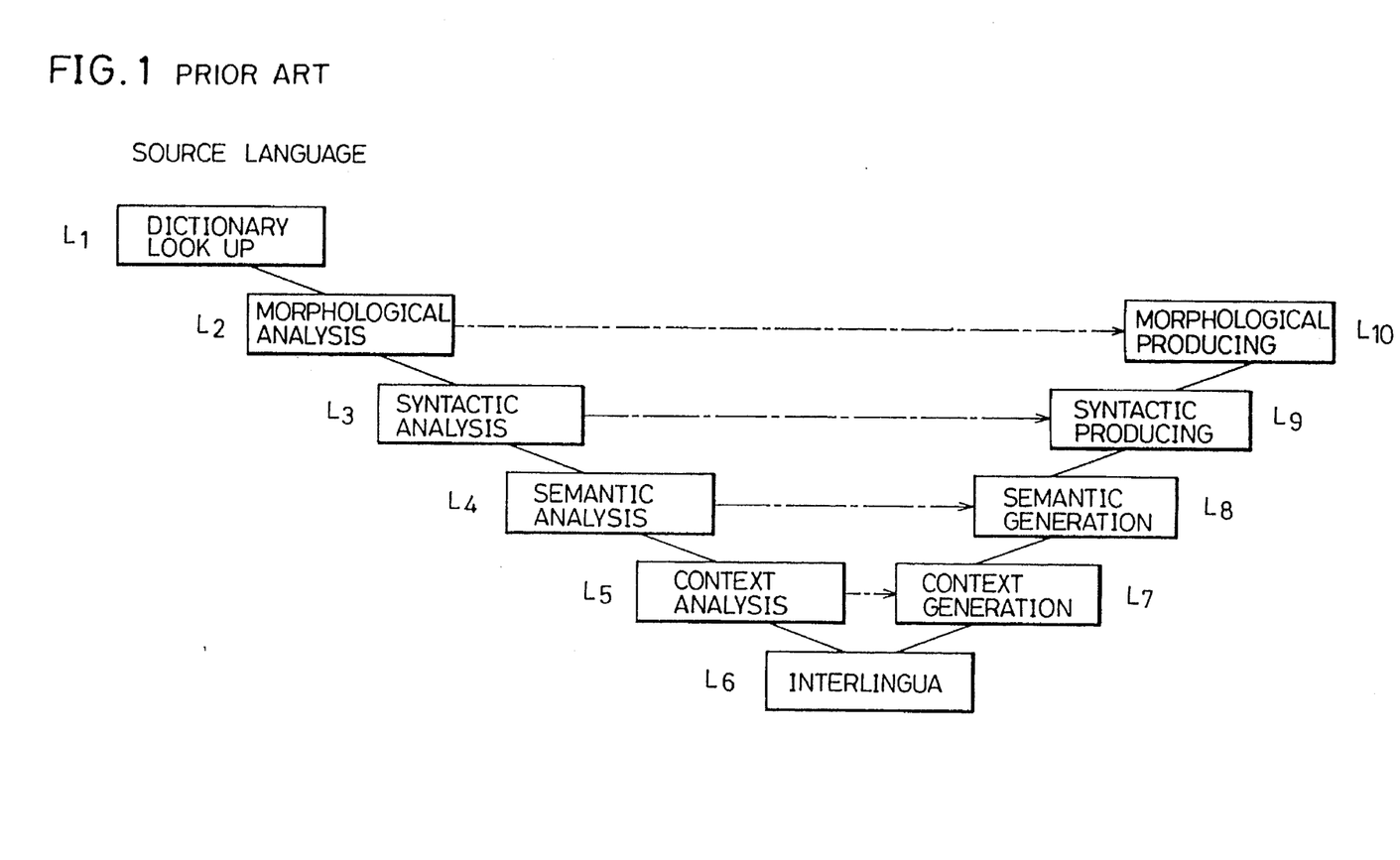
FIG. 1 is a schematic illustration of a machine translation method.

Before describing the preferred embodiment, the concept of machine translation will be briefly explained. Referring to FIG. 1, an analyzing processing performed with translation machines goes through various analysis levels. In machine translation, a source language sentence as displayed at the upper left side of FIG. 1 is input. Various processes are sequentially performed and a target language sentence as displayed on the right side in FIG. 1 is eventually obtained. If, for example, a source language sentence is input, processing begins with a dictionary look-up processing at level L1 to a morphological processing at level L2, then syntactic analyzing processing at level L3, . . ., and finally a morpheme generating processing at level L10 that yields a target language sentence.

Machine translation is roughly divided into the following two kinds depending upon the level to which the analyzing processing is performed. One type is a pivot method in which an analysis is performed as far as the intermediate language (so called "interlingua") as displayed at level L6, and a target language sentence is produced therefrom. The other kind is a transfer method by which an analysis is performed at one of levels L2–L5 to provide the internal structure of a source language sentence. Then the internal structure obtained is converted into the internal structure of a target language at the same level as the internal structure of the source language, thereby producing the target language sentence.

An interlingua used in the pivot method is a concept which does not depend on a source language or a target language. Accordingly, once the interlingua is obtained by processing the source language, translations to a plurality of languages can be produced from this interlingua, which is advantageous for translating between several languages. However, according to such pivot method, it is uncertain if the interlingua, which is the essential concept of the method, can really be established.

The transfer method is a compromise approach to cope with the problem associated with the pivot method, and today, many systems adopt this transfer method. The following description concerns the transfer method, and a translating machine according to the embodiments which will be described later also employs the transfer method.

Now, the content of each analyzing processing level shown in FIG. 1 will be described.

(1) Dictionary Look-up (L1), Morphological Analysis (L2)

At these processing levels, an input sentence is divided into morpheme strings (word strings) utilizing, for example, the longest coincidence method while referring to a dictionary which stores morphemes. Then, grammatical information such as the part of speech of each of the obtained words and a translation for each word is provided. Finally, the words of the sentence are analyzed for determining tense/person/number, etc.

(2) syntactic Analysis (L3)

At this processing level, constructing and determining the structure (parsing tree) of the sentence such as the relation between words is performed based on the part of speech/variant. As part of this processing, the determination of whether or not the obtained structure of the sentence represents the correct meaning is not performed.

(3) Semantic Analysis (L4)

What is correct and what is not correct in terms of meaning are determined among a plurality of parsing trees obtained as a result of the syntactic analyzing processing, and the process used for adopting only the correct one is performed.

(4) Context Analysis (L5)

In a context analyzing processing, the topic of the input sentence is comprehended. Omitted parts are supplied and ambiguity removed.

Figure 2:
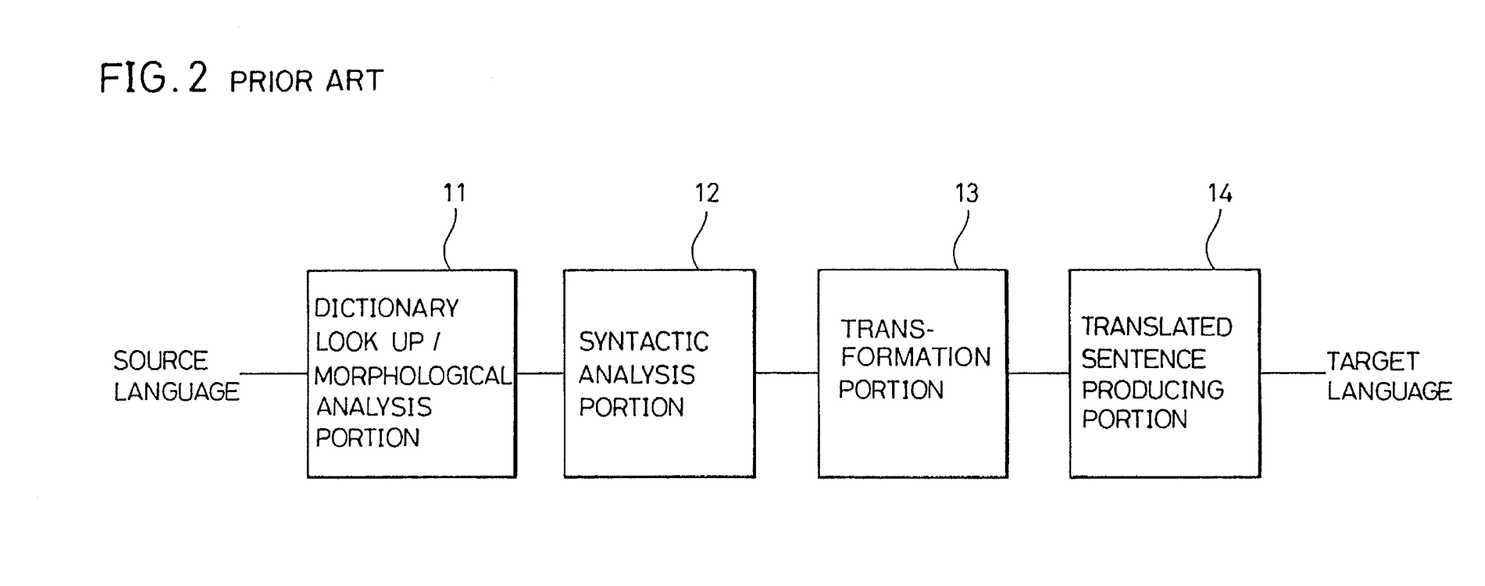
FIG. 2 is a schematic illustration of the construction of a machine translation according to a transfer method.

In the translation module of the translating machine including an electronic dictionary and a dictionary retrieval apparatus according to one embodiment of the invention which will be described later, it is assumed that analyzing processing is performed as far as level L3. More specifically, the translation module of the translating machine according to the embodiment has a structure as shown in FIG. 2. The translation module includes a dictionary look-up/morphological analyzing portion 11 for performing dictionary look-up/morphological analyzing processing to a source language text. A syntactic analyzing portion 12 is used for performing syntactic analyzing processing to an input sentence which has been morphologically analyzed. A transformation portion 13 generates the parsing tree of a target language by transforming the results of the syntactic analysis. A translated sentence generating portion generates a translated sentence in the target language based on the parsing tree of the target language generated by transformation portion 13. The processes performed in portions 11–14 will be described in detail in conjunction with the embodiments.

Figure 3:
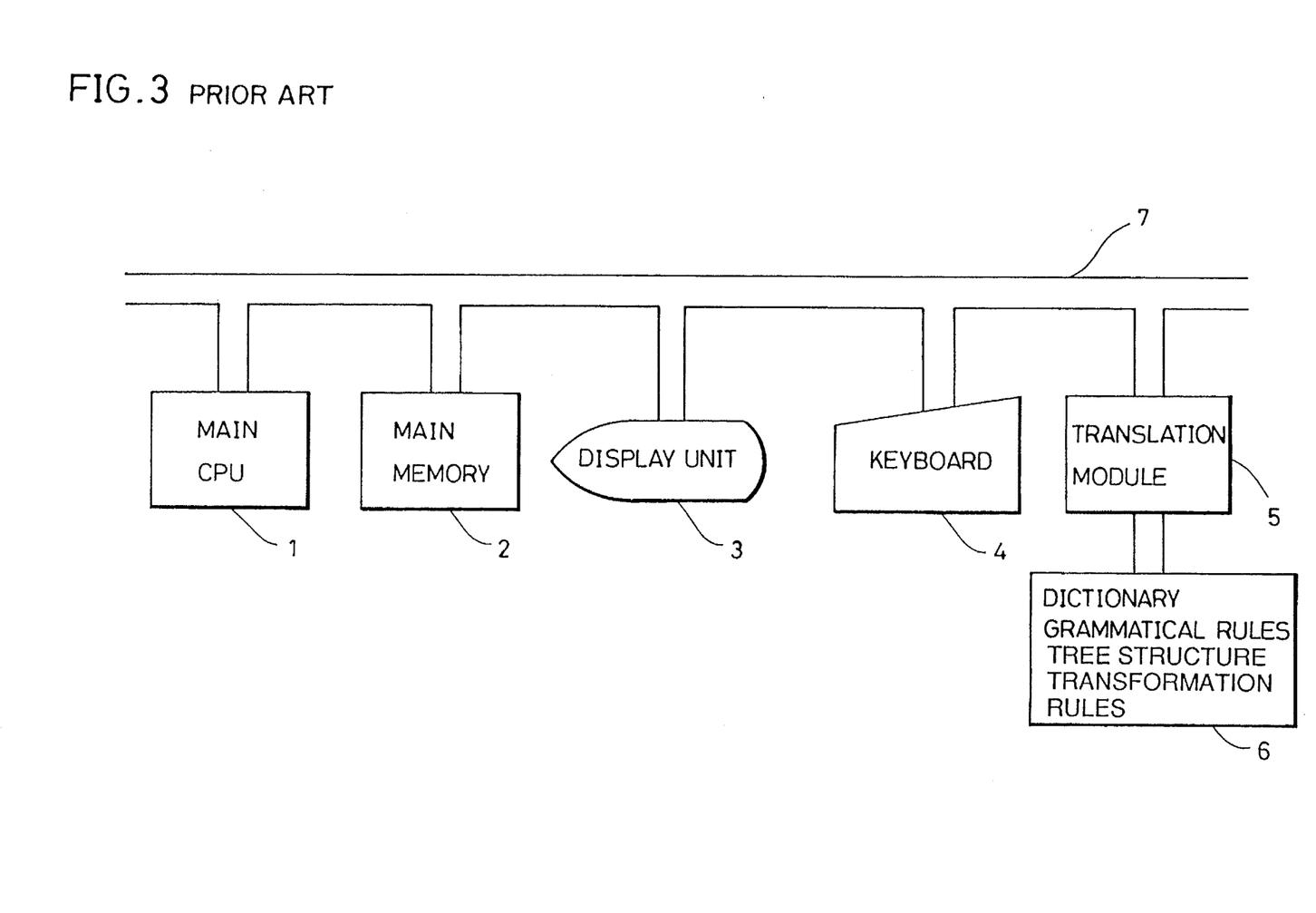
FIG. 3 is a block diagram showing a translating machine with an example of a dictionary retrieval apparatus according to a preferred embodiment of the invention.

FIG. 3 is a block diagram showing a translating machine according to a preferred embodiment of the language processing apparatus according to the invention.

Referring to FIG. 3, the translating machine includes a main CPU (Central Processing Unit) 1, a main memory 2, a display unit 3 formed of a CRT (Cathode Ray Tube), an LCD (Liquid Crystal Display) or the like, a keyboard, a translation module 5, and a memory 6 which stores information such as dictionary/grammatical rules and tree transformation structure rules for translation connected to a translation module 5. Each of elements 1–5 are connected via a bus 7.

Figure 4:
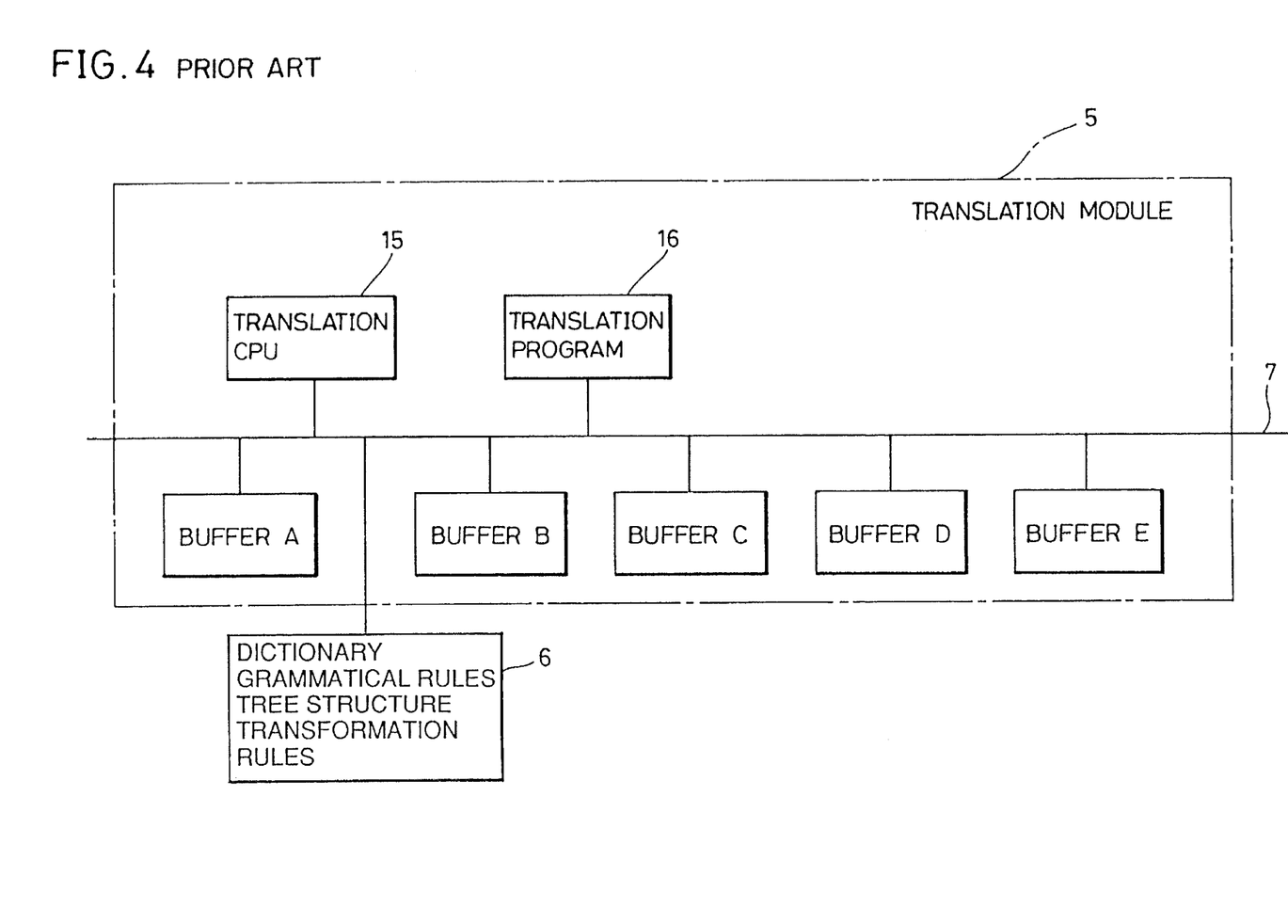
FIG. 4 is a block diagram showing the translation module 5 of FIG. 3.

When a sentence in a source language is input, translation module 5 outputs a target language sentence by translating the sentence using a prescribed procedure. Referring to FIG. 4, translation module 5 includes a translation CPU 15 for translating the source language sentence (English in this embodiment) input through bus 7 according to a prescribed translation program and outputting the translated result as a target language sentence (Japanese in this embodiment) to bus 7. A translation program memory 16 stores translation programs executed in the translation CPU 15. A buffer A stores the original inputted source language sentence on a word-by-word basis. A buffer B stores information such as the part of speech or a translation for each word obtained by referring to the dictionary included in memory 6. A buffer C stores information concerning the parsing tree of the source language sentence. A buffer D stores the parsing tree of a target language sentence which is generated by transforming the parsing tree of the source language sentence stored in buffer C. A buffer E stores sentences rearranged in a Japanese style by adding appropriate particle and auxiliary verbs to the parsing tree of the Japanese sentence stored in buffer D.

Referring to FIGS. 3–9, an operation for translating from English to Japanese by a translating machine according to the preferred embodiment will be described. Translation programs executed by translation CPU 15 will be later described in detail.

Figure 5:
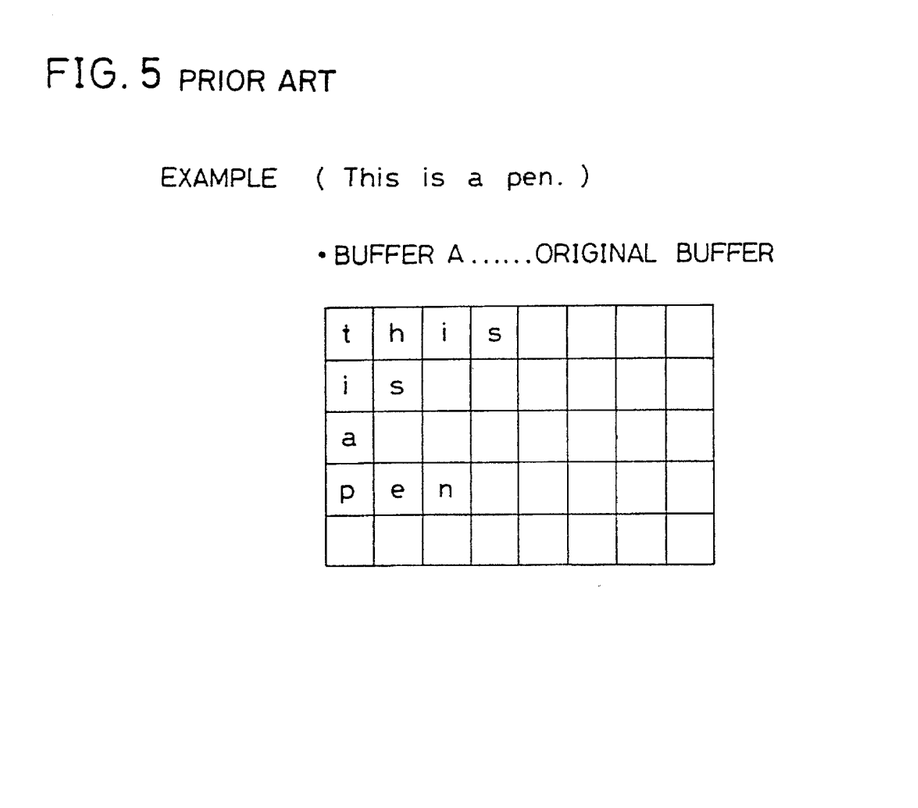
FIGS. 5-9 are schematic representations showing the storage contents of buffers A, B, C, D, and E, respectively.

An original sentence is decomposed into morphemes by a morphological analysis, and stored in buffer A (see FIG. 4) as illustrated in FIG. 5.

Figure 6:
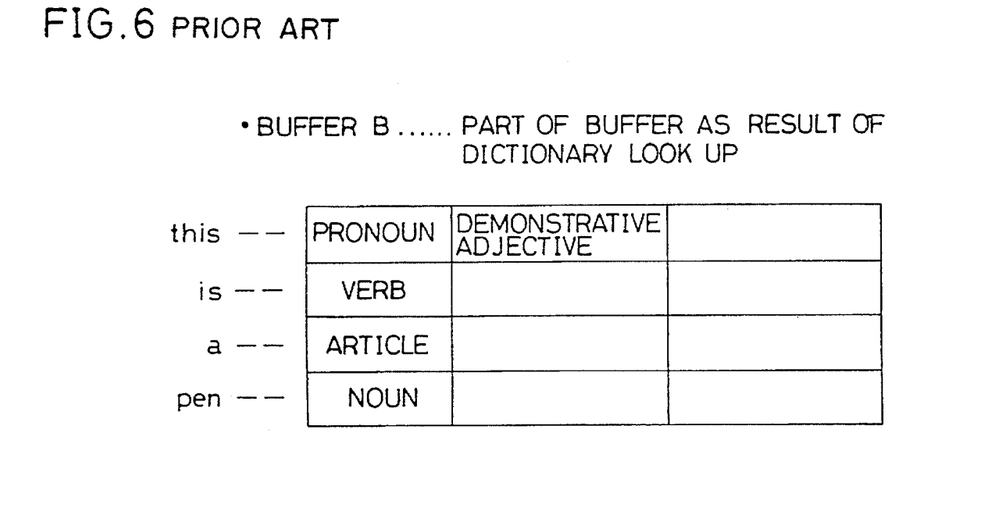

Then, information including the translation and part of speech information of each word in the original sentence, as stored in buffer A, is determined by the dictionary look-up/morphological analyzing portion 11 illustrated in FIG. 2 under the control of the translation CPU 15 using the translation program 16 and referring to a selected dictionary stored in memory 6. The resulting information is stored in buffer B. As part of this information, the part of speech for each word is stored as illustrated in FIG. 6. More specifically, the word "this", for example, has a plurality of associated parts of speech i.e., two parts of speech, pronoun and demonstrative adjective. The part of speech for the word "is" is verb. Similarly, the parts of speech for the words "a" and "pen" are stored in buffer B. The word "this" has a plurality of parts of speech, and the part of speech to be employed in the sentence is uniquely decided corresponding to the one selected by the syntactic analyzing portion 12 as illustrated in FIG. 2.

Figure 7:
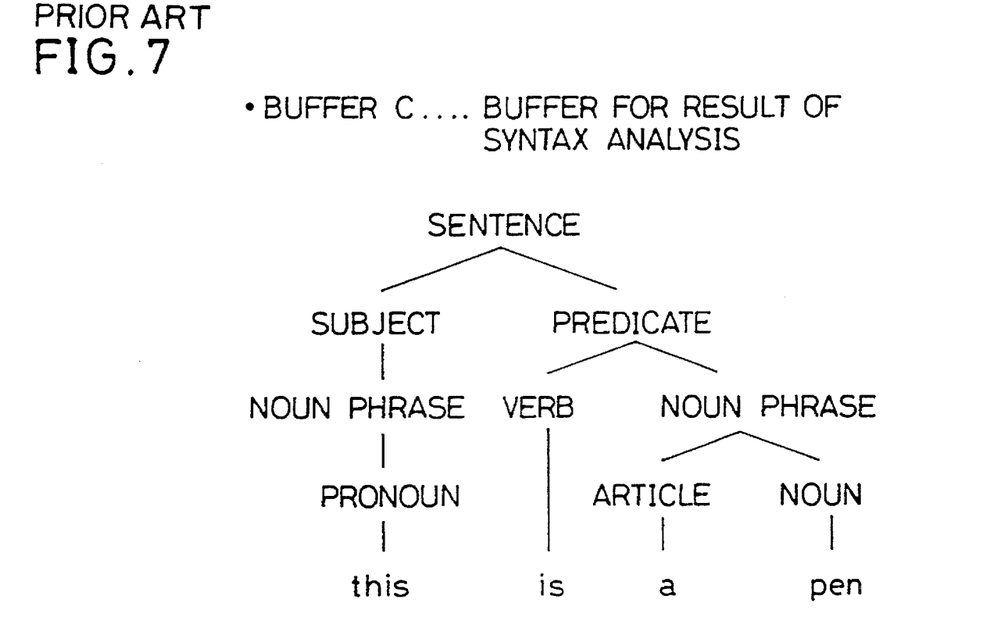
Figure 8:
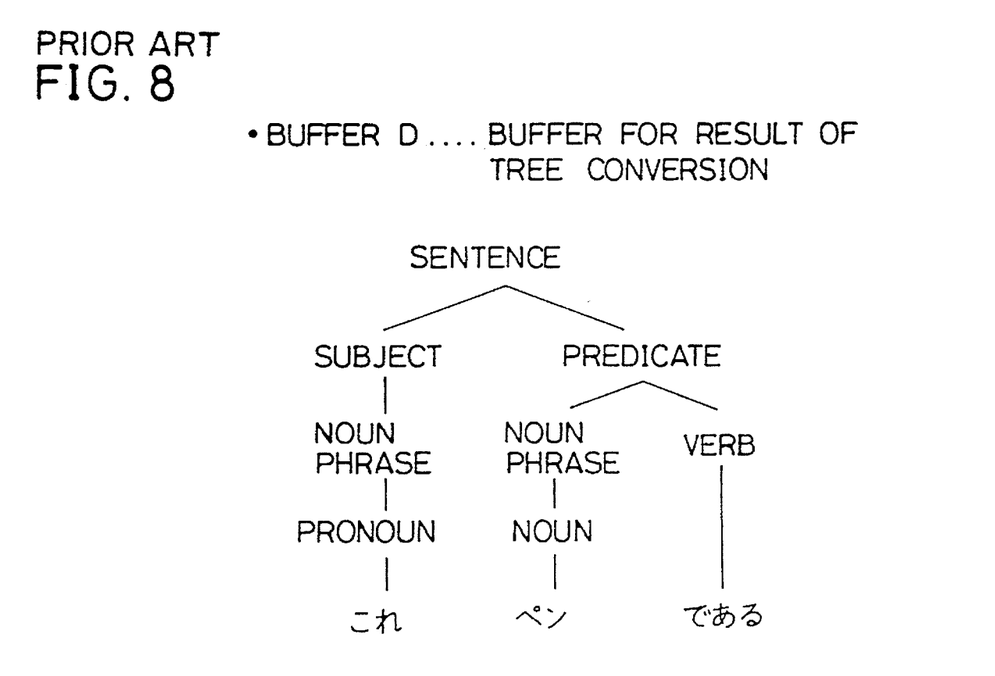

As illustrated in FIG. 7, a parsing tree showing the relationship between words is decided using the dictionary and the grammatical rules stored in memory 6. The result of the syntactic analysis is stored in buffer C.

The parsing tree is created as follows. Among the grammatical rules stored in memory 6, grammatical rules related to English include the following elements.

Sentence→Subject, Predicate

Subject→Noun Phrase

Predicate→Verb Noun Phrase

Noun Phrase→Pronoun

Noun Phrase→Article, Noun

Among the above rules, the first rule indicates that "a sentence can be formed of a subject and a predicate". The parsing tree is created based on these rules. It is noted that similar grammatical rules are also prepared for Japanese, and correspondence is preestablished between the English grammatical rules and the Japanese grammatical rules.

In the translation program, corresponding to transformation portion 13 illustrated in FIG. 2, the structure of the parsing tree (see FIG. 8) of the English sentence is transformed into the structure of a parsing tree corresponding to a Japanese sentence. In this transformation, as in the case of the above-described syntactic analyzing portion 12, "tree structure transformation rules" stored in memory 6 are used. This step corresponds to a transformation from level L3 to level L9 of the target language as shown in FIG. 1. The result is stored in buffer D. The example sentence used in the description "this is a pen" will be converted into a Japanese character string "これ, ペン, である" by this transformation.

Figure 9:
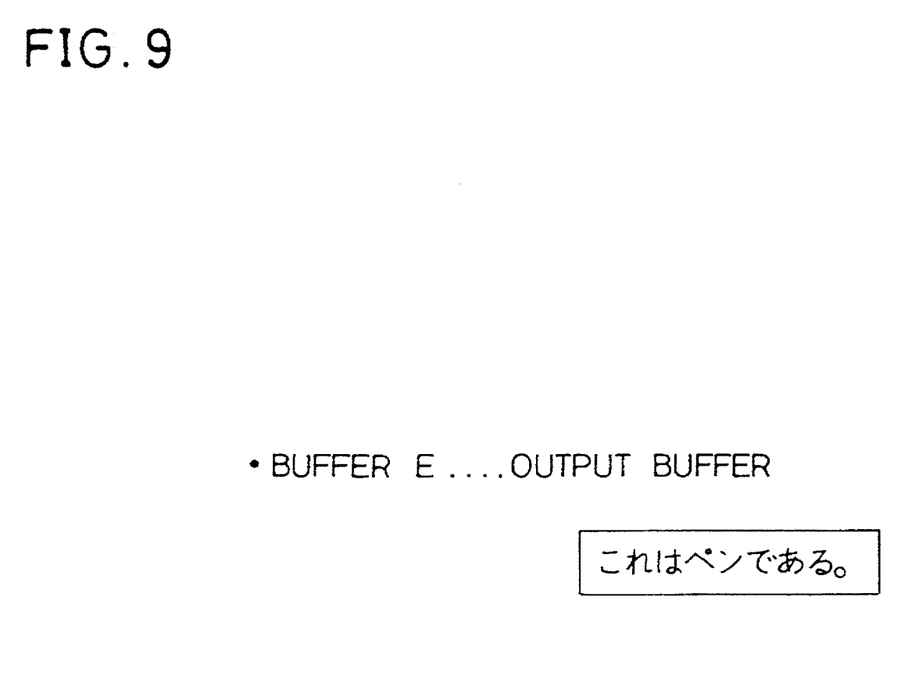

In the translation program, the portion corresponding to translation producing portion 14 in FIG. 2 adds an appropriate particle "は" or an auxiliary verb to the resultant Japanese character string "これ, ペン, である" to form a grammatical Japanese sentence as shown in i FIG. 9, and the same is stored in buffer E. This processing corresponds to the steps from level L9 to level L10. The resultant Japanese sentence "これは, ペン, である" is output from translation module 5 shown in FIG. 4 and stored in main memory 2 for display by display unit 3.

Now, the process of identifying an idiom (in English for example) registered by a representative form and an input character string, and for outputting a translation will be described in detail in conjunction with FIGS. 10–17.

Figure 12:
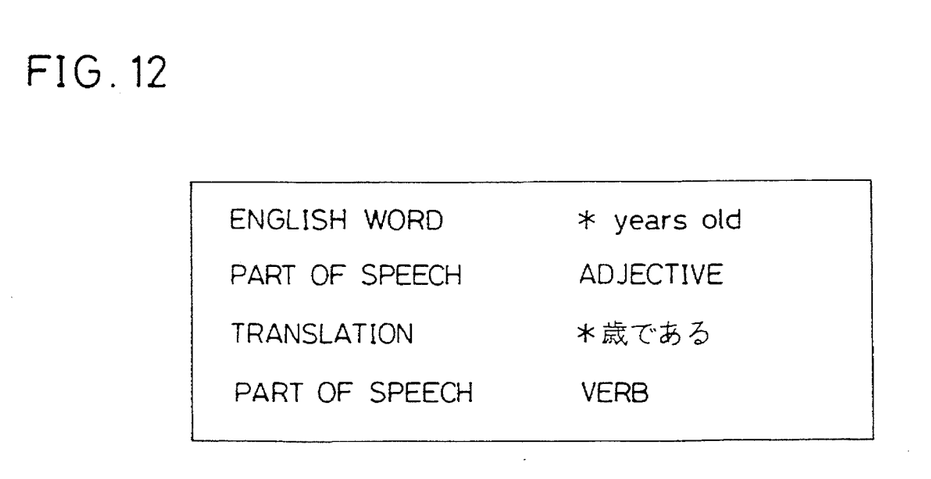
FIGS. 12-15 are schematic representations each showing one example of an idiom dictionary registration by a representative form.

FIGS. 12-17 show registration of an idiom by a representative form. Referring to FIG. 12, an entry "* years old" and translation "*歳, である" are registered as one item. Each "*" of the entry and translation corresponds to a number. The portion of the phrase having the number is variable.

Figure 13:
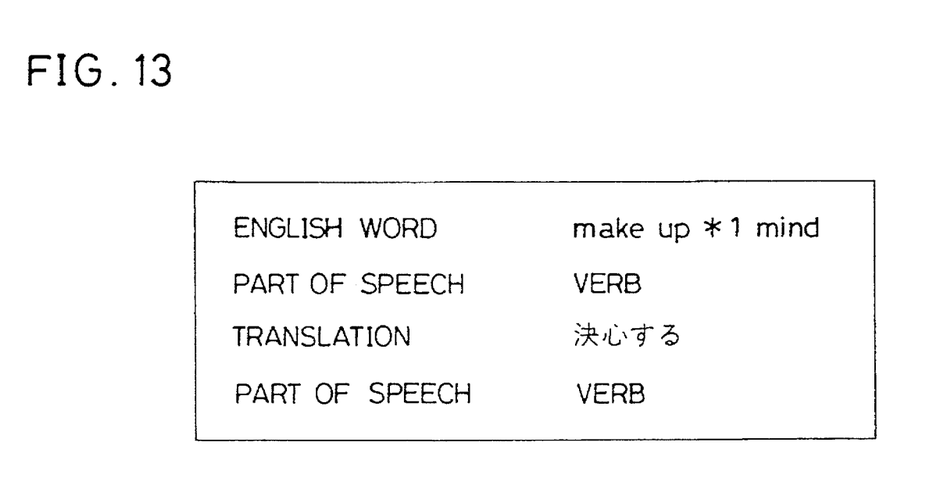

FIG. 13 illustrates registration of the word "one's" as part of an entry "make up one's mind" by a representative form. The entry is "make up *1 mind", and "*1" corresponds to a possessive pronoun. The possessive pronoun is variable. A translation corresponding to this idiom is "決心する", and it is noted that the part corresponding to the possessive pronoun of the entry does not appear in the translation.

Figure 14:
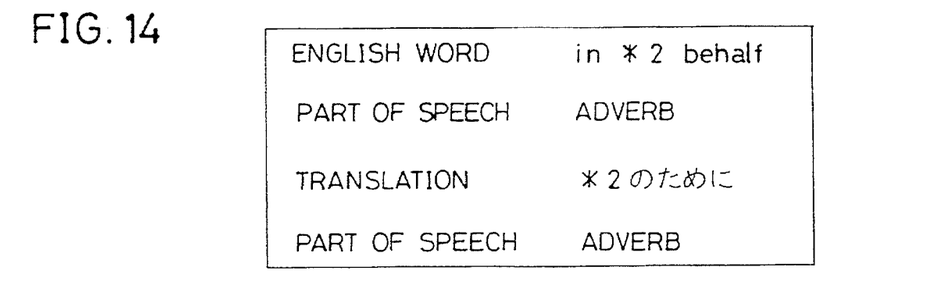

FIG. 14 is an example of a registration according to the representative form of an idiom "in one's behalf". The entry is "in *2 behalf", and a corresponding translation is "の た, のに". The "*2" of the entry and the "*2" of the translation correspond to possessive pronouns. These possessive pronouns are variable.

Figure 15:
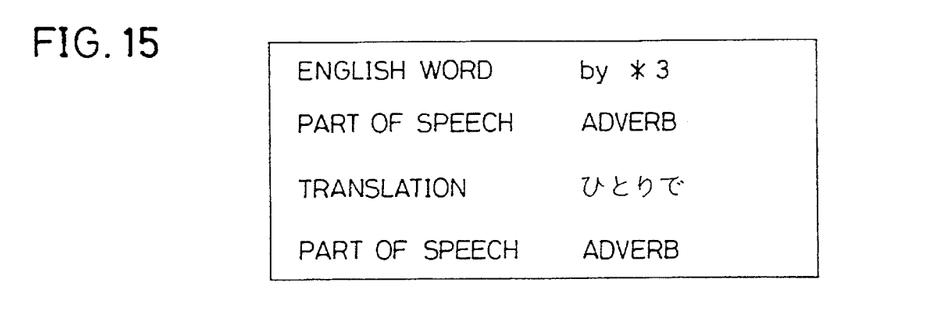

FIG. 15 shows an example of a registration according to the representative form of an idiom "by oneself". Referring to FIG. 15, the entry in this case is "by *3", and a corresponding translation is _人で. The "*3" of the entry corresponds to a reflexive pronoun, and this reflexive pronoun is variable. In the translation, the part corresponding to the reflexive pronoun does not appear.

Figure 10:
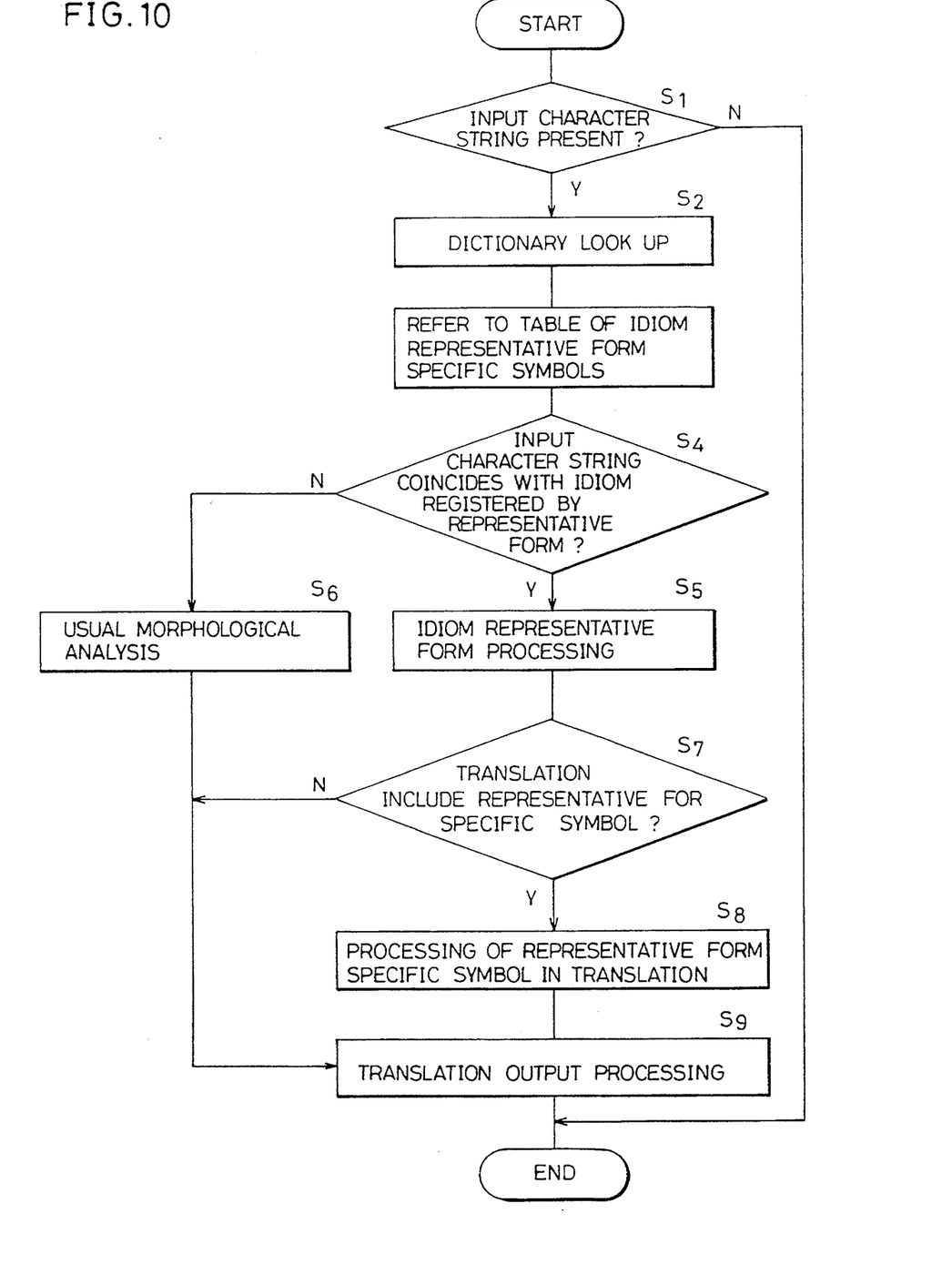
FIG. 10 is flowchart illustrating the identification processing of an idiom registered utilizing a representative form and an input character string, and a translation output processing.
Figure 11:
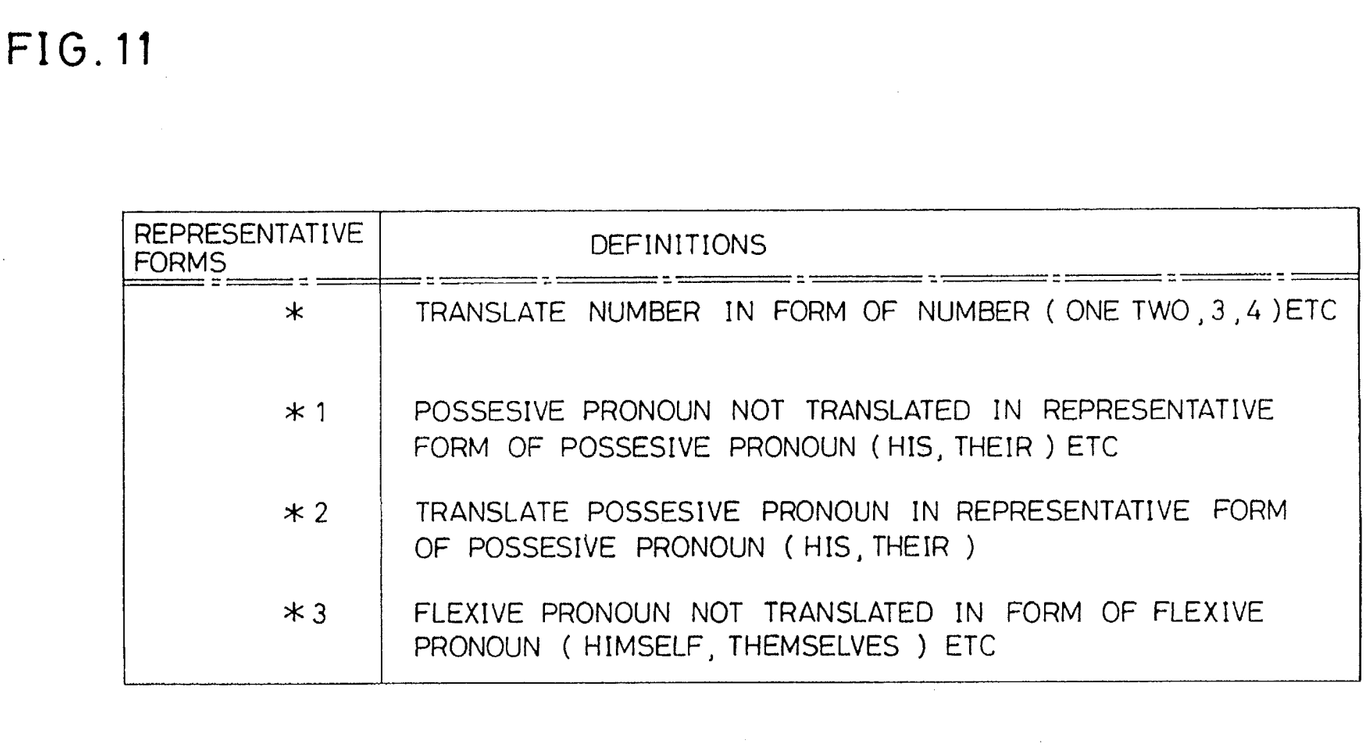
FIG. 11 is a schematic illustration of a table of idiom representative specific symbols.

The representative forms "*", "*1", "*2" and "*3" shown in FIGS. 10–15 and their definitions are set forth in FIG. 11. Pairs of representative forms and their definitions as shown in FIG. 11 are stored in memory 6 as a table of representative specific symbols.

Referring to FIG. 10, identification processing of an idiom registered according to a representative form and an input character string and translation output processing will be described in conjunction with FIG. 10.

In step S1, it is determined whether or not a character string is input. If a character string is inputted, the processing proceeds to step S2, but if it is determined that no character string is input, the processing ends. In this example, it is assumed that "3 years old" is input. Therefore, the processing proceeds to step S2.

Figure 16:
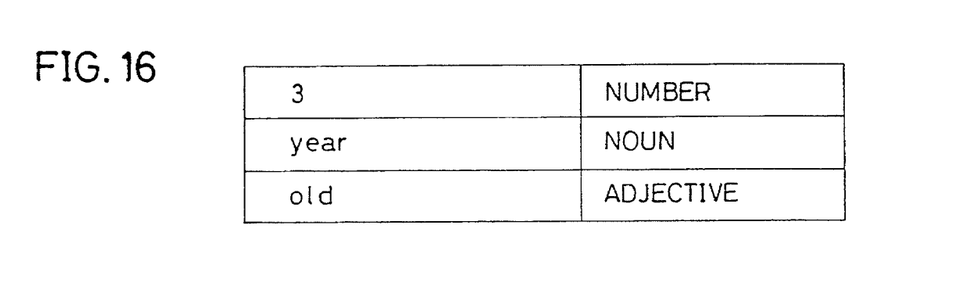
FIG. 16 is a schematic representation showing part of the content of a part-of-speech buffer for a result of dictionary pick up.
Figure 17:
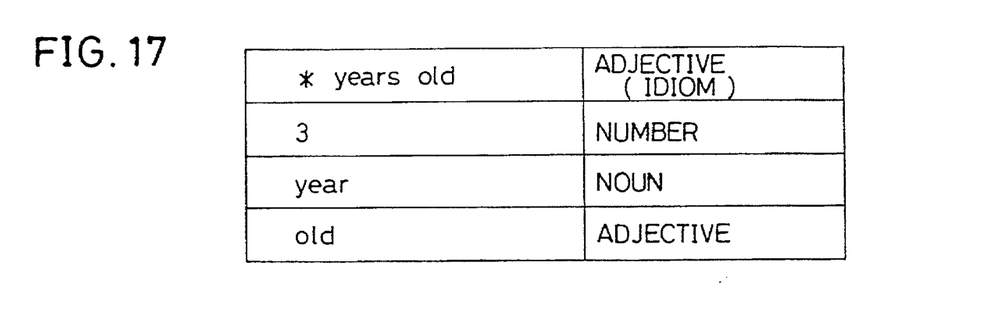
FIG. 17 is a schematic representation showing part of the content of a part-of-speech buffer after idiom representative form processing.

In step S2, a dictionary look-up is performed. The dictionary look-up is performed by referring to a dictionary in memory 6, utilizing the input character string as a key. The result is stored in buffer B in a form as shown in FIG. 16. Referring to FIG. 16, the information that "3" is a number, "year" is a noun, and "old" is an adjective can be obtained as the result of the processing in step S2.

In step S3, the table of representative specific symbols in FIG. 11 is referenced. The information that the representative form "*" represents a number is read out from the table.

Then in step S4, a determination of whether or not the input character string coincides with entry of the idiom registered by the representative form. In this case, it has been recognized that "3" in "3 years old" is a number. In the idiom shown in FIG. 12, "*" is the representative form of a number as shown in FIG. 11. Accordingly, the input character string "3 years old" is determined to be in agreement with the idiom registration example "* years old" shown in FIG. 12, and control proceeds to step S5. Meanwhile, if it is determined that the input character string and the idiom representative form do not agree in step S4, the processing proceeds to step S6.

If the processing proceeds to step S5, a processing called idiom representative form processing is performed. The idiom representative form processing adds an idiom to the contents of buffer B as shown in FIG. 16. Then a morphological analysis is performed.

Control proceeds to step S7, where it is determined whether or not the representative symbol is used in the translation. In the present example, the translation "才 である" uses the representative symbol "*". Therefore, processing proceeds to step S8, and the number "3" of the input character string "3 years old" is inserted corresponding to "*" of the idiom "* years old". After step S8, the processing proceeds to step S9.

Meanwhile, if the processing proceeds from step S4 to S6, a usual morphological analysis is performed before proceeding to step S9. If it is determined that a representative symbol is not used in the translation in step S7, thee processing directly proceeds to step S9.

In step S9, a translation is outputted corresponding to the input character string. In the present example a translation "3歳, である" is output The processing then ends.

In a process similar to the above-described process, if an input character string "make up his mind", for example, is determined to be in agreement with "make up *1 mind", then a translation "決心する" shown in FIG. 13 is output. In this case, since a representative form is not registered for the translation, the translation is directly output. An input character string "in her behalf" is determined to be in coincidence with "in *2 behalf". As a result, a "の, た, のに" shown in FIG. 14 is extracted, and a translation "彼女" corresponding to the word "her" in the input character string corresponding to "*2" of the entry replaces a translation "*2" to output a translation "彼女, の た, のに". An input character string "by yourself"

coincides with the entry "by *3" shown in FIG. 15 and is output as "—人で".

As described above, for variable words in an English idiom such as numbers, possessive pronouns, or flexive pronouns, a word or a word string having such an attribute can be represented by one representative form. Each idiom is registered in the electronic dictionary as an item having an entry string including a representative form such that if an entry is retrieved with any of the words represented by the representatives form, an idiom including the variable part can be registered and read out as one item. If a part included in the item, which should be changed depending upon the variable part of the entry, is present in the information extracted by a retrieval, a representative symbol is inserted at a corresponding position in the information. The representative symbol is appropriately replaced depending upon the corresponding word in the input character string. Thus, an idiom that requires different translations dependent upon the particular use can be registered as one item. Since several idioms can be registered as one item utilizing a representative form, several entries can be retrieved using the representative form thereby decreasing the storage capacity of the dictionary necessary to store the information.

It is noted that in the description of the above embodiment, the case described is where only part of an idiom is treated as an input character string. However, this is for the purpose of simplification of description only. When the above description is applied to a translating machine or the like, not only idioms but also a sentence including an idiom(s) registered by a representative form can be processed as an input character string.

For example, in an input character string "She was 5 years old", it is analyzed that "She" is a pronoun, "was" is a verb, and "5 years old" is an idiom for an adjective registered by a representative form. As a result, a translation is produced by extracting a translation corresponding to each entry, a translation "彼女は、5歳、でした" is output.

As described above, in the electronic dictionary according to the invention, the part changing its form can be treated as a representative form and several idiom variations of the same form can be registered as one entry. Accordingly, several character strings can be retrieved corresponding to entries utilizing the same representative form. It is not necessary to store each character string as a separate entry and decreasing the required storage capacity.

According to one aspect of the electronic dictionary, a plurality of character strings including parts which are substantially identical as an entry but can actually change their forms can be registered as one entry utilizing a first representative form. A plurality of character strings replaced with words represented by the first representative form can be retrieved in association with this one entry, and a second representative symbol present in information associated with the entry can be replaced with an appropriate word dependent upon a corresponding position of the original character string to provide information appropriate for the specific character string. Since a plurality of character strings can be registered by one entry string utilizing a representative form, the necessary storage capacity can be decreased.

According to one aspect of the invention, when an electronic dictionary for use is constructed, an entry string including an entry or a variable part for a symbol can be registered utilizing one representative form. Since it is not necessary to register individual entry strings specifically including each variable part, time and labor for dictionary registration can be reduced as compared to conventional systems.

A dictionary retrieval apparatus according to a still further aspect of the invention can store an entry including a variable part in a prescribed part of information corresponding to the entry utilizing one representative form, when an electronic dictionary is constructed. Therefore, the time and labor necessary for registration of each entry in an electronic dictionary can be reduced as compared to conventional systems.

Although the present invention has been described and illustrated in detail, it is clearly understood that the same is by way of illustration and example only and is not to be taken by way of limitation, the spirit and scope of the present invention being limited only by the terms of the appended claim.

What is claimed is:

1. An electronic translating device comprising:
   means for inputting a character string in a source language;
   electronic dictionary means for storing a plurality of idiom reference forms, each form representing a defined word phrase and having a fixed portion and a variable portion, wherein the variable portion of each idiom reference form having at least one common attribute represented by one or more variable symbols; and
   means for translating the inputted character string from the source language to a target language by comparing the inputted character string with said plurality of idiom reference forms.

2. An electronic translating device as recited in claim 1, wherein each variable symbol within each idiom form represents a defined group of words with common attributes.

3. An electronic translating device as recited in claim 2, wherein each variable symbol within each idiom form represents a defined group of words of the same part of speech.

4. An electronic translating device as recited in claim 1, wherein said source language is English.

5. An electronic translating device as recited in claim 1, wherein said target language is Japanese.

6. An electronic dictionary and retrieval apparatus comprising:
   means for inputting a sentence in a source language;
   means for storing a plurality of idiom forms each having a fixed portion and a variable portion, each idiom form representing a defined word phrase with common attributes wherein the variable portion is represented by one:or more variable symbols; and
   means for retrieving a selected one of said idiom forms stored in said storage means that coincides with an idiom in the inputted sentence.

7. An electronic dictionary and retrieval apparatus as recited in claim 6, wherein each variable symbol within each idiom form represents a defined group of words with common attributes.

8. An electronic dictionary and retrieval system as recited in claim 6, wherein each variable symbol within each idiom form represents a defined group of words of the same part of speech.

9. An electronic dictionary and retrieval apparatus as recited in claim 6, further comprising:
   means for translating the inputted sentence from the source language to a target language using said electronic dictionary means by comparing the inputted sentence with said plurality of idiom forms.

10. An electronic translating device for translating from a source language to a target language, comprising:
- means for inputting a source language sentence;
- means for storing a plurality of idiom forms each having a fixed portion and a variable portion, each idiom form representing a defined word phrase with common attributes wherein the variable portion being represented by one or more variable symbols;
- means for retrieving a selected one of said idiom forms stored in said storage means that coincides with an idiom in the source language sentence;
- means for translating the source language sentence from a source language to a target language using one of said idiom forms as retrieved by said retrieving means.

11. An electronic translating device as recited in claim 10, wherein each variable symbol within each idiom form represents a defined group of words with common attributes.

12. An electronic translating device as recited in claim 10, wherein each variable symbol within each idiom form represents a defined group of words of the same part of speech.

* * * * *